United States Patent
Drochon et al.

(10) Patent No.: US 6,903,042 B2
(45) Date of Patent: Jun. 7, 2005

(54) CATALYTIC COMPOSITION AND PROCESS FOR OLIGOMERIZING ETHYLENE, IN PARTICULAR TO 1-HEXENE

(75) Inventors: Sébastien Drochon, Rueil Malmaison (FR); Séverine Guibert, Bougival (FR); Lucien Saussine, Croissy sur Seine (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 13 days.

(21) Appl. No.: 10/309,336

(22) Filed: Dec. 4, 2002

(65) Prior Publication Data

US 2003/0130551 A1 Jul. 10, 2003

(30) Foreign Application Priority Data

Dec. 10, 2001  (FR) .......................................... 01 16006

(51) Int. Cl.[7] .............................................. B01J 31/00
(52) U.S. Cl. ...................... 502/150; 502/169; 502/171; 585/212; 585/500; 568/454
(58) Field of Search .................. 502/150, 169, 502/171; 585/212, 500; 568/454

(56) References Cited

U.S. PATENT DOCUMENTS

| | | | | |
|---|---|---|---|---|
| 5,723,399 A | * | 3/1998 | Takemoto et al. | 502/113 |
| 5,750,817 A | * | 5/1998 | Tanaka et al. | 585/520 |
| 5,856,257 A | * | 1/1999 | Freeman et al. | 502/152 |
| 5,859,303 A | * | 1/1999 | Lashier | 585/513 |
| 5,910,619 A | * | 6/1999 | Urata et al. | 585/513 |
| 6,031,145 A | * | 2/2000 | Commereuc et al. | 585/512 |
| 6,040,483 A | * | 3/2000 | Olivier et al. | 568/454 |
| 6,117,956 A | * | 9/2000 | Luo | 526/145 |
| 6,300,436 B1 | * | 10/2001 | Agapiou et al. | 526/154 |
| 6,326,443 B1 | * | 12/2001 | Monoi et al. | 526/129 |
| 6,369,174 B1 | * | 4/2002 | Wenzel et al. | 526/74 |
| 6,417,243 B1 | * | 7/2002 | Peeters et al. | 522/31 |
| 6,465,585 B2 | * | 10/2002 | Luo | 526/128 |
| 6,528,596 B2 | * | 3/2003 | Takaoki et al. | 526/113 |
| 2001/0023281 A1 | * | 9/2001 | Commereuc et al. | |

FOREIGN PATENT DOCUMENTS

FR  2 764 524  12/1998
FR  2 802 833  6/2001

OTHER PUBLICATIONS

Patent Abstract of Japan—vol. 011, No. 139 (C–420), May 7, 1987 & JP 61 275303 A (Mitsui Toatsu Chem Inc), Dec. 5, 1986.

* cited by examiner

*Primary Examiner*—Mark L. Bell
*Assistant Examiner*—Jennine Brown
(74) *Attorney, Agent, or Firm*—Millen, White, Zelano & Branigan, P.C.

(57) ABSTRACT

A catalytic composition for oligomerizing ethylene, in particular to 1-hexene, is obtained by mixing at least one chromium carboxylate characterized in that it also contains a free carboxylic acid in a set proportion, with at least one aryloxy compound of an element M selected from the group formed by magnesium, calcium, strontium and barium, with general formula $M(RO)_{2-n}X_n$ in which RO is an aryloxy radical containing 6 to 80 carbon atoms, X is a halogen atom or a hydrocarbyl radical containing 1 to 30 carbon atoms and n is a whole number that can take the values 0 or 1, and with at least one hydrocarbylaluminum compound selected from the group formed by tris(hydrocarbyl)-aluminum compounds, chlorinated or brominated hydrocarbylaluminum compounds and aluminoxanes.

32 Claims, No Drawings

CATALYTIC COMPOSITION AND PROCESS FOR OLIGOMERIZING ETHYLENE, IN PARTICULAR TO 1-HEXENE

BACKGROUND OF THE INVENTION

1. Field of the Invention

The present invention relates to oligomerizing ethylene, in particular its trimerization, principally to 1-hexene.

2. Description of the Prior Art

Processes for producing alpha-olefins from ethylene generally result in an assembly of oligomers containing 4 to 30 carbon atoms or even more, the olefins obtained then being separated by distillation. For several years, demand for lower oligomers has been increasing, essentially for 1-butene, 1-hexene and 1-octene, which are used in particular as co-monomers with ethylene in producing linear low-density polyethylene.

Few catalysts exist that selectively result in the formation of a particular oligomer, as is the case when dimerizing ethylene to 1-butene with a titanium-based catalyst. However, it is known that catalysts based on chromium can principally result in the formation of 1-hexene, with greater or lesser quantities of polyethylene, the proportion of butenes and octenes in the products being very small (R M Manyik, W E Walker, T P Wilson, J. Catal., 1977, 47, 197 and J R Briggs, J. Chem. Soc., Chem. Commun. 1989, 674 and cited references). Catalysts that allow more or less selective trimerization of ethylene have been described, for example, in U.S. Pat. Nos. 5,198,563, 5,288,823, 5,382,738 and European patent applications Nos. 608,447, 611,743 and 614,865. These catalysts are prepared from a chromium salt and a metallic amide, in particular a pyrrolide. Other catalysts make use of an aluminoxane and a chromium complex with a chelating phosphine (U.S. Pat. No. 5,550,305).

French Patent No. 2,764,524 describes a catalytic composition obtained by mixing at least one chromium compound with at least one aryloxy aluminum compound and at least one hydrocarbylaluminum compound, which has a particular selectivity for forming 1-butene and/or 1-hexene by oligomerizing ethylene.

French patent application No. 2,802,833 describes a catalytic composition obtained by mixing at least one chromium compound with at least one aryloxy compound of an element selected from the group formed by magnesium, calcium, strontium and barium, and at least one hydrocarbylaluminum compound, which has a particular selectivity for forming 1-hexene by oligomerizing ethylene.

SUMMARY OF THE INVENTION

It has now been discovered, in accordance with the present invention, that a catalytic composition obtained by mixing at least one chromium carboxylate characterized in that it also contains a free carboxylic acid in a set proportion, with at least one aryloxy compound of an element M selected from the group formed by magnesium, calcium, strontium and barium, and with at least one hydrocarbylaluminum compound has a greater activity and a particular selectivity for forming 1-hexene by oligomerizing ethylene. The quantity of polymeric by-product is also considerably reduced.

DETAILED DESCRIPTION OF THE INVENTION

More precisely, said catalytic composition is obtained by mixing:

at least one chromium carboxylate characterized in that it also contains a free carboxylic acid in a set proportion; with at least one aryloxy compound of an element M selected from the group formed by magnesium, calcium, strontium and barium, with general formula $M(RO)_{2-n}X_n$ in which RO is an aryloxy radical containing 6 to 80 carbon atoms, X is a halogen atom or a hydrocarbyl radical containing 1 to 30 carbon atoms and n is a whole number that can take the values 0 or 1;

and with at least one hydrocarbylaluminum compound selected from the group formed by tris(hydrocarbyl)-aluminum compounds, chlorinated or brominated hydrocarbylaluminum compounds with general formula $AlR'_m Y_{3-m}$, in which R' is a hydrocarbyl radical containing 1 to 6 carbon atoms, Y is a chlorine or bromine atom and m is a number from 1 to 3, and aluminoxanes.

The chromium carboxylate can be a chromium (II) or chromium (III) carboxylate, and also a carboxylate with a different oxidation number. It can comprise one or more identical or different carboxylate anions, depending on the oxidation number of the chromium. Non-limiting examples of carboxylate anions that can be cited are acetate, propionate, butyrate, pivalate, valerate, hexanoate, heptanoate, octoate, 2-ethylhexanoate, laurate, stearate and oleate anions. Preferred chromium carboxylates used in the invention are chromium (III) carboxylates as they are more accessible, but a chromium (II) carboxylate may also be suitable.

The chromium carboxylate used in the invention also contains a free carboxylic acid in a set proportion. The free carboxylic acid can comprise one or more carboxylate anions identical or different from the carboxylate anions of chromium carboxylate. The free carboxylic acid can be introduced into the chromium carboxylate at the time it is produced, or it can be added (if there is not enough) or removed (if there is too much) subsequently following its production.

The proportion of free carboxylic acid with respect to the chromium is such that the mole ratio of the free acid to the chromium metal is preferably in the range 1:1 to 2.5:1, more preferably in the range 1:1 to 2:1.

The aryloxy compound of element M is selected from the group formed by aryloxy compounds of magnesium, calcium, strontium or barium, with general formula $M(RO)_{2-n}X_n$ in which RO is an aryloxy radical containing 6 to 80 carbon atoms, X is a halogen atom (chlorine or bromine) or a hydrocarbyl radical containing 1 to 30 carbon atoms, which may be linear or branched, for example alkyl, cycloalkyl, alkenyl or aryl, or substituted aralkyl, aryl or cycloalkyl, preferably a hydrocarbyl residue containing 2 to 10 carbon atoms, and n is a whole number that can take the values 0 or 1.

Preferred aryloxy compounds of element M comprise an aryloxy radical RO with general formula:

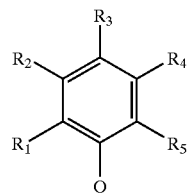

in which $R_1$, $R_2$, $R_3$, $R_4$ and $R_5$, which may be identical or different, each represent a hydrogen atom, a halogen atom or a hydrocarbyl radical, for example alkyl, cycloalkyl, alkenyl or aryl or substituted aralkyl, aryl or cycloalkyl, preferably containing 1 to 16 carbon atoms, and particularly 1 to 10 carbon atoms. Non-limiting examples of $R_1$, $R_2$, $R_3$, $R_4$ and $R_5$ are the methyl, ethyl, n-propyl, isopropyl, n-butyl, tert.-butyl, cyclohexyl, benzyl, phenyl, 2-methylphenyl, 2,6-dimethylphenyl, 2,4,6-trimethylphenyl and 2-methyl-2-phenylprop-1-yl residues.

Preferred examples of aryloxy radicals that can be cited are 4-phenylphenoxy, 2-phenylphenoxy, 2,6-diphenylphenoxy, 2,4,6-triphenylphenoxy, 2,3,5,6-tetraphenylphenoxy, 2-tert-butyl-6-phenylphenoxy, 2,4-di-tert-butyl-6-phenylphenoxy, 2,6-diisopropylphenoxy, 2,6-dimethylphenoxy, 2,6-di-tert-butylphenoxy, 4-methyl-2,6-di-tert-butylphenoxy, 2,6-dichloro-4-tert-butylphenoxy and 2,6-dibromo-4-tert-butylphenoxy. When the aryloxy compound of element M is selected from aryloxides with formula $M(RO)_2$, the two aryloxy radicals can be carried by the same molecule, for example the biphenoxy radical, the binaphthoxy radical or the 1,8-naphthalene-dioxy radical, substituted or unsubstituted with alkyl, aryl or halide radicals.

Preferably, the aryloxy radical of element M is selected from bis(2,6-diphenylphenoxy)-magnesium, bis(2-tert-butyl-6-phenylphenoxy)-magnesium and bis(2,4-di-tert-butyl-6-phenylphenoxy)-magnesium.

The preparation of the compound $M(RO)_{2-n}X_n$ has been described in the literature. Any process for preparing that compound is suitable, such as reacting a phenol ROH with a dialkylmetallic element in an organic solvent, for example a hydrocarbon or an ether.

The hydrocarbylaluminum compounds used in the invention are selected from the group formed by tris(hydrocarbyl) aluminum compounds, chlorinated or brominated hydrocarbylaluminum compounds and aluminoxanes. The tris (hydrocarbyl)-aluminum compounds and the chlorinated or brominated hydrocarbylaluminum compounds are represented by general formula $AlR'_m Y_{3-m}$ in which R' is a hydrocarbyl radical, preferably alkyl containing 1 to 6 carbon atoms, Y is a chorine or bromine atom, preferably a chlorine atom, and m is the number 1 to 3. Non limiting examples that can be cited are dichloroethylaluminum, ethylaluminum sesquichloride, chlorodiethylaluminum, chlorodiisobutylaluminum, triethylaluminum, tripropylaluminum, triisobutylaluminum and methylaluminoxane; the preferred hydrocarbylaluminum compound is triethylaluminum.

The components of the catalyst can be brought into contact in a solvent constituted by a saturated hydrocarbon such as hexane, cyclohexane, heptane, butane, isobutane, by an unsaturated hydrocarbon such as a monoolefin or a diolefin containing, for example, 4 to 20 carbon atoms, or by an aromatic hydrocarbon such as benzene, toluene, ortho-xylene, mesitylene or ethylbenzene, used pure or as a mixture.

The concentration of chromium in the catalytic solution is preferably in the range $1 \times 10^{-5}$ to 0.1 mole/l, more preferably $5 \times 10^{-5}$ to $1 \times 10^{-2}$ mole/l. The mole ratio between the aryloxy compound of element M and the chromium compound is preferably in the range 1:1 to 30:1, more preferably in the range 1:1 to 20:1. The mole ratio between the hydrocarbylaluminum compound and the chromium compound is preferably in the range 1:1 to 35:1, more preferably in the range 1:1 to 15:1. With regard to the above ratios and concentrations as well as the mol ratio of the free acid to the chromium metal, it has been discovered that the optimum yield of the $C_6$ fraction and the 1-hexene purity can be obtained by routine experimentation for any given system, for example to obtain a yield of the $C_6$ fraction of at least 80%, preferably at least 85%, with a hexene-1 percentage purity in the $C_6$ fraction of at least about 98%, preferably at least 99%.

The order of mixing the three constituents of the catalytic composition is not critical. However, it is preferable to first mix the chromium carboxylate containing the free carboxylic acid with the aryloxy compound of element M and then to add the hydrocarbylaluminum compound.

The ethylene oligomerization reaction can be carried out at a total pressure of 0.5 to 15 MPa, preferably 1 to 8 MPa, and at a temperature of 20° C. to 180° C., preferably 50° C. 160° C.

In a particular implementation of a discontinuous catalytic oligomerization reaction, a selected volume of the catalytic solution prepared as described above is introduced into a reactor provided with the normal stirring, heating and cooling means, then it is pressurized with ethylene to the desired pressure, and the temperature is adjusted to the desired value. The oligomerization reactor is kept at a constant pressure by introducing ethylene until the total volume of the liquid produced represents, for example, 2 to 50 times the volume of the catalytic solution originally introduced. The catalyst is then destroyed by any normal means that is known to the skilled person, then the reaction products and the solvent are extracted and separated.

For a continuous operation, the implementation is preferably as follows: the catalytic solution is injected at the same time as the ethylene into a reactor stirred by conventional mechanical means or by external recirculation, and kept at the desired temperature. It is also possible to separately inject the components of the catalyst into the reaction medium, for example the product of the interaction of chromium carboxylate with the aryloxy compound of element M and also the hydrocarbylaluminum compound. Ethylene is introduced via a pressure-controlled inlet valve, which keeps the pressure constant. The reaction mixture is extracted using a liquid level-controlled valve to keep the liquid level constant. The catalyst is continuously destroyed using any normal means then the reaction products and the solvent are separated, for example by distillation. Non-transformed ethylene can be recycled to the reactor.

The following examples illustrate the invention without limiting its scope.

EXAMPLE 1

$0.5 \times 10^{-3}$ moles of chromium in the form of chromium (III) 2-ethylhexanoate containing 1.3 moles of free acid per mole of chromium diluted with 25 ml of distilled ortho-xylene and kept under an inert atmosphere was introduced in the absence of air and moisture into a 100 ml glass flask under an inert atmosphere. The proportion of free acid in the chromium salt was determined by assaying with tetrabutylammonium hydroxide. Vacuum distillation of the chromium salt identified the free acid as a mixture of acetic acid and 2-ethylhexanoic acid.

5 ml of the chromium (III) 2-ethylhexanoate solution prepared above, namely $0.1 \times 10^{-3}$ moles of chromium, then $0.1 \times 10^{-3}$ moles of bis(2,6-diphenylphenoxy) magnesium in solution in ortho-xylene and $0.3 \times 10^{-3}$ moles of triethylaluminum in solution in ortho-xylene were introduced in order under ethylene into a stainless steel autoclave with a working volume of 100 ml provided with a double jacket for adjusting the temperature by oil circulation. The temperature was raised to 140° C. and the ethylene pressure was kept at 3 MPa.

After 20 minutes of reaction, ethylene introduction was halted and the reactor was cooled and degassed, then the gas and liquid were analyzed by gas phase chromatography. 21 g of ethylene had been consumed in 20 minutes. The composition of the products is given in Table 1. 18% by weight of polymer with respect to the ethylene consumed was also recovered.

EXAMPLE 2

Using the same apparatus as that used in Example 1 and using the same conditions, with the exception that the batch of chromium 2-ethylhexanoate used contained 1.85 moles of free acid per mole of chromium, 19 g of ethylene was consumed in 30 minutes of reaction. The composition of the products is shown in Table 1. 11% by weight of polymer with respect to the ethylene consumed was also recovered.

EXAMPLE 3

Using the same apparatus as that used in Example 1 and using the same conditions, with the exception that the batch of chromium 2-ethylhexanoate used contained 1.6 moles of free acid per mole of chromium, 20.6 g of ethylene was consumed in 38 minutes of reaction. The composition of the products is shown in Table 1. 8.4% by weight of polymer with respect to the ethylene consumed was also recovered.

EXAMPLE 4 (COMPARATIVE)

Using the same apparatus as that used in Example 1 and using the same conditions, with the exception that the batch of chromium 2-ethylhexanoate used contained 0.4 moles of free acid per mole of chromium, 10 g of ethylene was consumed in 60 minutes of reaction. The composition of the products is shown in Table 1. 51% by weight of polymer with respect to the ethylene consumed was also recovered.

EXAMPLE 5 (COMPARATIVE)

Using the same apparatus as that used in Example 1 and using the same conditions, with the exception that the batch of chromium 2-ethylhexanoate used contained 3 moles of free acid per mole of chromium, 0.6 g of ethylene was consumed in 60 minutes of reaction. The composition of the products is shown in Table 1. 33% by weight of polymer with respect to the ethylene consumed was also recovered.

TABLE 1

| Example | Distribution of oligomers (% by weight) | | | | 1-hexene in C6 |
|---|---|---|---|---|---|
| | C4 | C6 | C8 | C10+ | (% by weight) |
| 1 | 1.4 | 74.4 | 1.4 | 3.9 | 98.8 |
| 2 | 1.3 | 84.4 | 1.0 | 2.3 | 98.9 |
| 3 | 0.7 | 87.0 | 1.0 | 2.9 | 99.6 |
| 4 (comp) | 5.0 | 38.0 | 2.8 | 3.0 | 95.8 |
| 5 (comp) | 5.3 | 61.9 | traces | traces | 97.0 |

The preceding examples can be repeated with similar success by substituting the generically or specifically described reactants and/or operating conditions of this invention for those used in the preceding examples.

The entire disclosures of all applications, patents and publications, cited herein and of corresponding French application No. 01/16.006, filed Dec. 10, 2001 are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A catalytic composition comprising a mixture of:
   at least one chromium carboxylate;
   at least one free carboxylic acid comprising one or more carboxylate anions identical or different from carboxylate anions of said at least one chromium carboxylate;
   at least one aryloxy compound of an element M selected from the group consisting of magnesium, calcium, strontium and barium, with general formula $M(RO)_{2-n}X_n$ in which RO is an aryloxy radical containing 6 to 80 carbon atoms, X is a halogen atom or a hydrocarbyl radical containing 1 to 30 carbon atoms and n is a whole number that can take the values 0 or 1; and
   at least one hydrocarbylaluminum compound selected from the group consisting of tris(hydrocarbyl)-aluminum compounds, chlorinated or brominated hydrocarbylaluminum compounds with general formula $AlR'_m Y_{3-m}$, in which R' is a hydrocarbyl radical containing 1 to 6 carbon atoms, Y is a chlorine or bromine atom and m is a number from 1 to 3, and aluminoxanes;
   wherein the proportion of free carboxylic acid with respect to the chromium is such that the mole ratio of the free acid to the chromium metal is greater than 0.4:1 and less than 3.0:1.

2. A composition according to claim 1, wherein the chromium carboxylate comprises one or more identical or different carboxylate anions selected from acetate, propionate, butyrate, pivalate, valerate, hexanoate, heptanoate, octoate, 2-etliylhexanoate, laurate, stearate and oleate anions.

3. A composition according to claim 1, wherein said at least one free carboxylic acid comprises carboxylate anions identical to said at least one chromium carboxylate.

4. A composition according to claim 1, wherein the proportion of free carboxylic acid with respect to the chromium is such that the mole ratio of the free acid to the chromium metal is in the range 1:1 to 2.5:1.

5. A composition according to claim 4, wherein in the aryloxy compound of element M with general formula $M(RO)_{2-n}X_n$, the aryloxy radical RO has general formula:

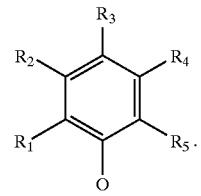

6. A composition according to claim 4, wherein the aryloxy radical of element M is selected from bis(2,6-diphenylphenoxy)-magnesium, bis(2-tert-butyl-6-phenylphenoxy)-magnesium and bis(2,4-di-tert-butyl-6-phenylphenoxy)-magnesium.

7. A composition according to claim 4, wherein the hydrocarbylaluminum compound is selected from dichloroethylaluminum, ethylaluminum sesquichloride, chlorodiethylaluminum, chlorodiisobutylaluminum, triethylaluminum, tripropylaluminum, triisobutylaluminum and methylaluminoxane.

8. A composition according to claim 4, wherein the hydrocarbylaluminum compound is triethylaluminum.

9. A composition according to claim 4, further comprising at least one solvent selected from the group consisting of a saturated, unsaturated, olefinic or diolefinic or aromatic hydrocarbon.

10. A composition according to claim 9, wherein the concentration of chromium in the catalytic solution is $1 \times 10^{-5}$ to 0.1 mole/l.

11. A composition according to claim 4, wherein the mole ratio between the aryloxy compound of element M and the chromium compound is in the range 1:1 to 30:1 and the mole ratio between the hydrocarbylaluminum compound and the chromium compound is in the range 1:1 to 35:1.

12. In a process for oligomerizing ethylene in contact with a catalytic composition, the improvement wherein the catalytic composition is according to claim 4.

13. A process according to claim 12, wherein the ethylene oligomerization reaction is carried out at a total pressure of 0.5 to 15 MPa and at a temperature of 20° C. to 180° C.

14. A composition according to claim 11, wherein the proportion of free carboxylic acid with respect to the chromium is such that the mole ratio of the free acid to the chromium metal is in the range 1:1 to 2:1.

15. A composition according to claim 14, wherein the aryloxy radical of element M is selected from bis(2,6-diphenylphenoxy)-magnesium, bis(2-tert-butyl-6-phenylphenoxy)-magnesium and bis(2,4-di-tert-butyl-6-phenylphenoxy)-magnesium.

16. A composition according to claim 15, wherein the chromium carboxylate is chromium III 2-ethylhexanoate.

17. A composition according to claim 2, wherein the hydrocarbylaluminum compound is triethylaluminum.

18. A composition according to claim 17, wherein the mol ratio of free acid to chromium metal is about 1.3:1 to 1.85:1.

19. In a process for oligomerizing ethylene in contact with a catalytic composition the improvement wherein the catalytic composition is according to claim 2.

20. A process according to claim 19, wherein the ethylene oligomerization reaction is carried out at a total pressure of 0.5 to 15 MPa and at a temperature of 20° C. to 180° C.

21. A composition according to claim 1, wherein the proportion of free carboxylic acid with respect to the chromium is such that the mole ratio of the free acid to the chromium metal is in the range 1:1 to 2:1.

22. A composition according to claim 4, wherein said chromium carboxylate is a chromium (II) carboxylate.

23. A composition according to claim 4, wherein said chromium carboxylate is a chromium (III) carboxylate.

24. A composition according to claim 4, wherein X is an alkyl, cycloalkyl, alkenyl, aryl, substituted aralkyl, substituted aryl or substituted cycloalkyl radical.

25. A composition according to claim 4, wherein X is a halogen atom or a hydrocarbyl radical containing 2 to 10 carbon atoms.

26. A composition according to claim 5, wherein $R_1$, $R_2$, $R_3$, $R_4$ and $R_5$ are each selected from methyl, ethyl, n-propyl, isopropyl, n-butyl, tert.-butyl, cyclohexyl, benzyl, phenyl, 2-methylphenyl, 2,6-dimethylphenyl, 2,4,6-trimethylphenyl and 2-methyl-2-phenylprop-1-yl.

27. A composition according to claim 4, wherein the aryloxy radical is 4-phenylphenoxy, 2-phenylphenoxy, 2,6-diphenylphenoxy, 2,4,6-triphenylphenoxy, 2,3,5,6-tetraphenylphenoxy, 2-tert-butyl-6-phenylphenoxy, 2,4-di-tert-butyl-6-phenylphenoxy, 2,6-diisopropylphenoxy, 2,6-dimethylphenoxy, 2,6-di-tert-butylphenoxy, 4-methyl-2,6-di-tert-butylphenoxy, 2,6-dichloro-4-tert-butylphenoxy or 2,6-dibromo-4-tert-butylphenoxy.

28. A composition according to claim 10, wherein the concentration of chromium in the catalytic solution is $5 \times 10^{-5}$ to $1 \times 10^{-2}$ mole/l.

29. A composition according to claim 4, wherein the mole ratio between the aryloxy compound of element M and the chromium compound is in the range 1:1 to 20:1.

30. A composition according to claim 4, wherein the mole ratio between the hydrocarbylaluminum compound and the chromium compound is in the range 1:1 to 15:1.

31. A process according to claim 12, wherein the ethylene oligomerization reaction is carried out at a total pressure of 1 to 8 MPa and at a temperature of 50° C. to 160° C.

32. A composition according to claim 4, wherein R' is an alkyl radical containing 1 to 6 carbon atoms.

* * * * *

UNITED STATES PATENT AND TRADEMARK OFFICE
CERTIFICATE OF CORRECTION

PATENT NO. : 6,903,042 B2  Page 1 of 1
APPLICATION NO. : 10/309336
DATED : June 7, 2005
INVENTOR(S) : Sebastian Drochon et al.

It is certified that error appears in the above-identified patent and that said Letters Patent is hereby corrected as shown below:

<u>Column 6,</u>
Line 25, "according to claim 1" should read -- according to claim 4 --.
Line 29, "2-etliylhexanoate" should read -- ethylhexanoate --.
Line 31, "according to claim 1" should read -- according to claim 4 --.

<u>Column 8,</u>
Line 19, reads "tetraphenyiphenoxy," should read -- tetraphenylphenoxy, --.

Signed and Sealed this

Twenty-ninth Day of May, 2007

JON W. DUDAS
*Director of the United States Patent and Trademark Office*